Figure 4:
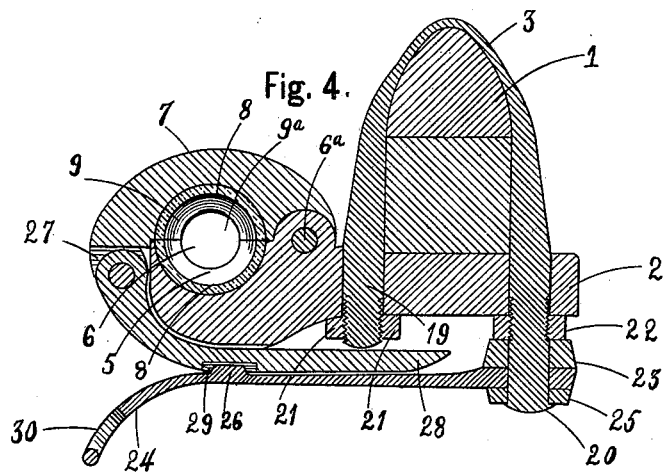

No. 621,123. Patented Mar. 14, 1899.
R. MULHOLLAND.
VEHICLE SHAFT COUPLING.
(Application filed Nov. 25, 1898.)
(No Model.) 4 Sheets—Sheet 1.
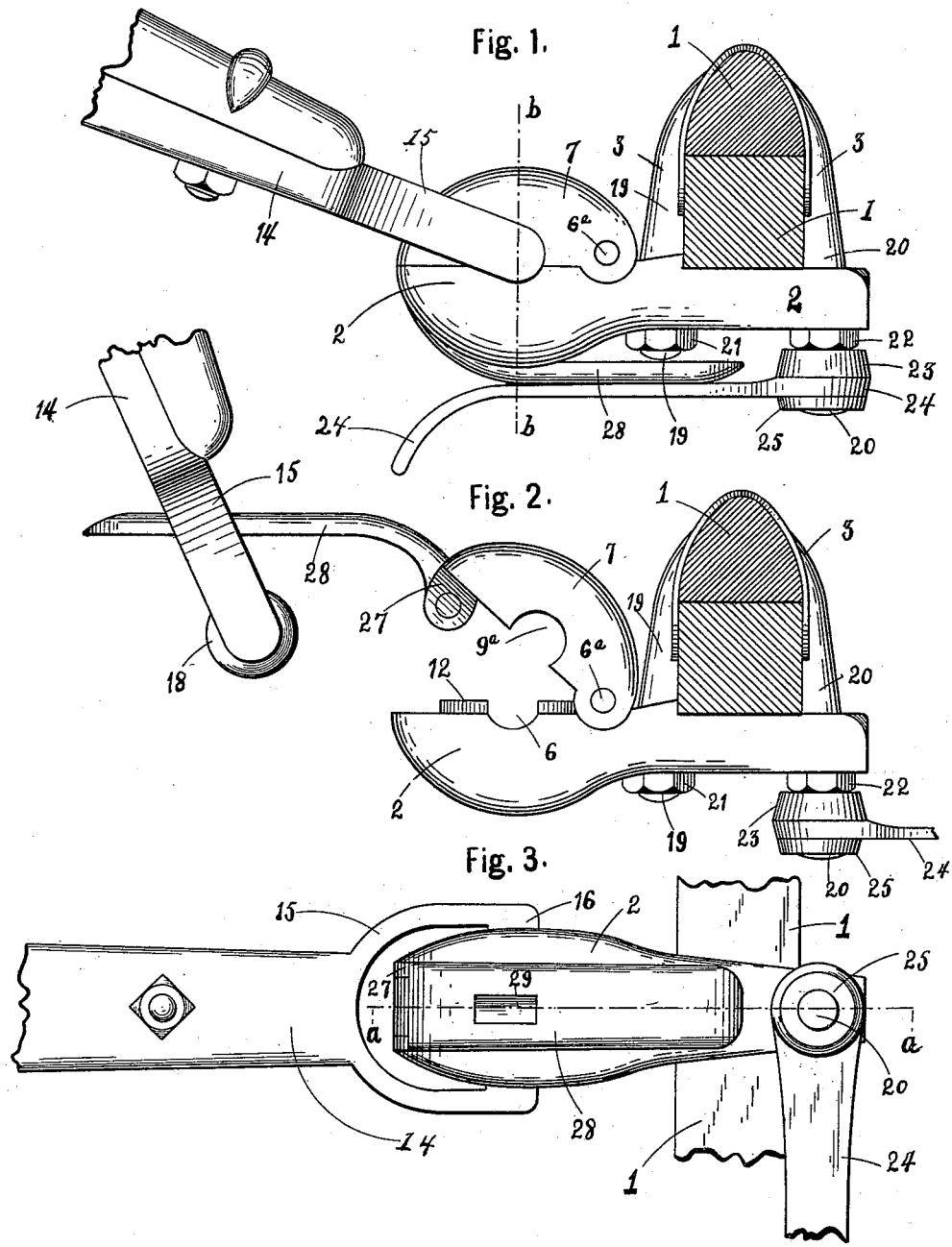
Witnesses,
L. M. Billings.
H. A. Neubauer.
Richard Mulholland Inventor.
By A. J. Sangster, Attorney.

No. 621,123. Patented Mar. 14, 1899.
R. MULHOLLAND.
VEHICLE SHAFT COUPLING.
(Application filed Nov. 25, 1898.)

(No Model.) 4 Sheets—Sheet 2.

Witnesses,
L. M. Billings.
J. A. Neubauer.

Richard Mulholland, Inventor.
By A. J. Sangster, Attorney.

THE NORRIS PETERS CO., PHOTO-LITHO., WASHINGTON, D. C.

No. 621,123. Patented Mar. 14, 1899.
R. MULHOLLAND.
VEHICLE SHAFT COUPLING.
(Application filed Nov. 25, 1898.)
(No Model.) 4 Sheets—Sheet 3.
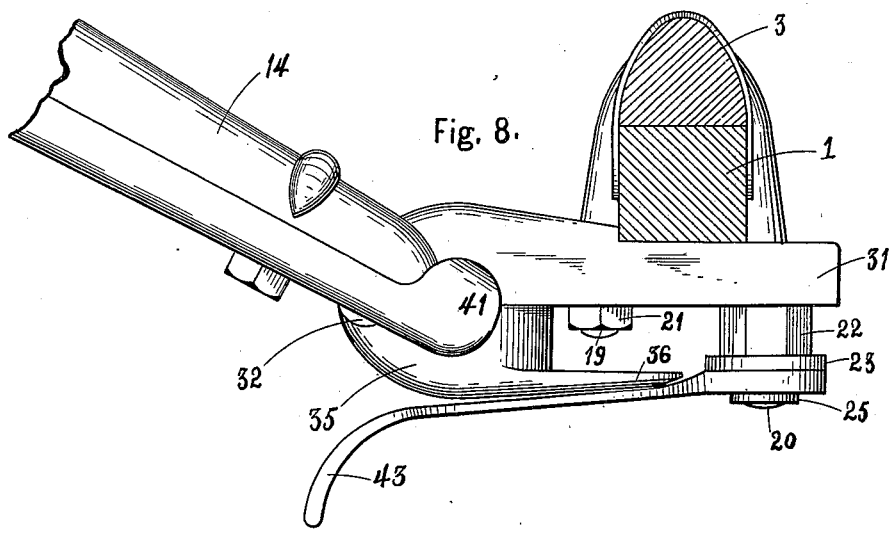
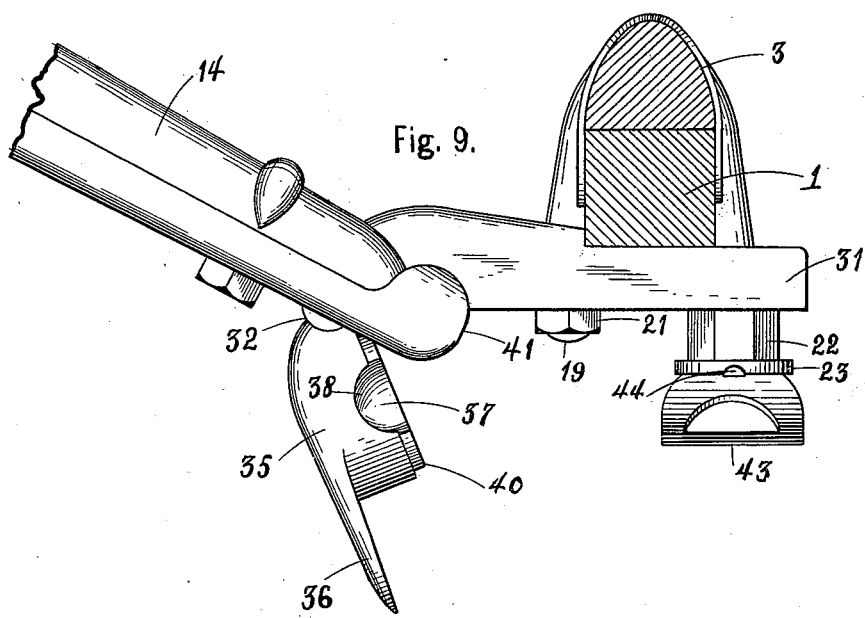
Witnesses, Richard Mulholland Inventor.
By A. J. Sangster, Attorney.

No. 621,123. Patented Mar. 14, 1899.
R. MULHOLLAND.
VEHICLE SHAFT COUPLING.
(Application filed Nov. 25, 1898.)
(No Model.) 4 Sheets—Sheet 4.
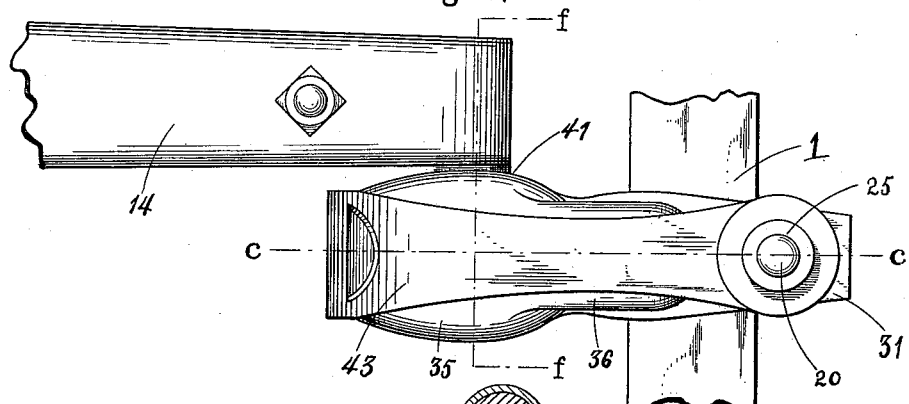
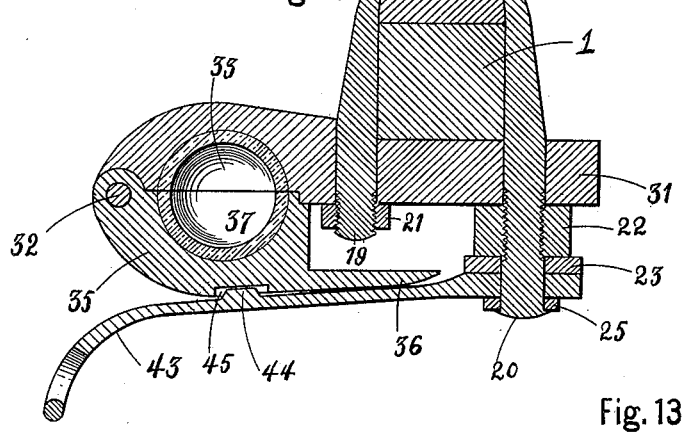
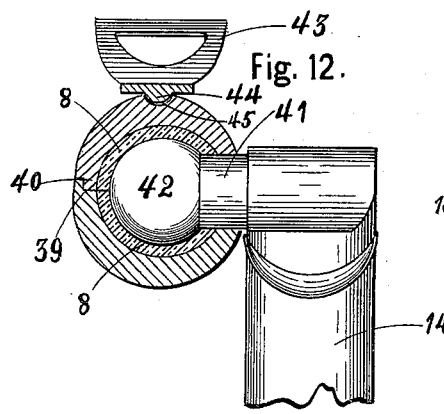
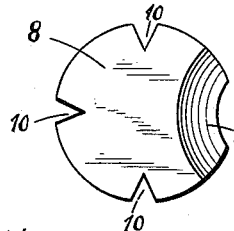
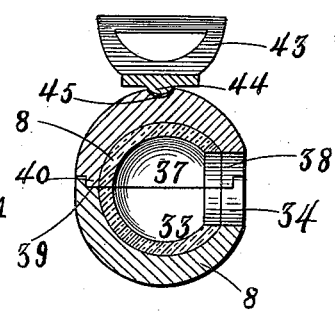
Witnesses,
L. M. Billings.
G. A. Neubauer.
Richard Mulholland, Inventor.
By A. J. Sangster, Attorney.

UNITED STATES PATENT OFFICE.

RICHARD MULHOLLAND, OF DUNKIRK, NEW YORK.

VEHICLE-SHAFT COUPLING.

SPECIFICATION forming part of Letters Patent No. 621,123, dated March 14, 1899.

Application filed November 25, 1898. Serial No. 697,334. (No model.)

*To all whom it may concern:*

Be it known that I, RICHARD MULHOLLAND, a citizen of the United States, residing at Dunkirk, in the county of Chautauqua and State of New York, have invented certain new and useful Improvements in Vehicle-Shaft Couplings, of which the following is a specification.

My invention relates to a vehicle-shaft coupling, and has particular reference to the class of coupling wherein either the draw-bar or the shaft connection is made in parts and provided with means for properly securing the parts together and whereby the shafts may be readily and quickly detached from or attached to the vehicle. Heretofore this class of shaft-couplings have been made with a stationary member or part and a movable member or part, with an open space between the members or parts to provide for the closing of said parts, as they wear from pressure when in use; but this is found to be objectionable, as dirt lodges between the open members or parts and works into the inner bearing, causing friction and quick wearing out of the bearings. Another objection to some of the couplings as heretofore made is the complicated use of links and joints to close and open the members or parts. These links and joints add to the cost of production and make the coupling look clumsy and heavy in appearance.

The objects of my invention are to produce a shaft-coupling of this character with but few parts, having means when closed together to prevent the entrance of dirt, to produce a suitable bushing for the socket in which the shaft connection is seated, and to dispense with all unnecessary links and joints, thus producing a simple, neat, and cheaply-constructed coupling.

My invention further consists in arranging the axle-clip to serve to secure the coupling to the axle and also to act as the support for the clamping device.

It also relates to certain details of construction, all of which will be fully and clearly hereinafter described and claimed.

For a full understanding of the merits and advantages of the invention reference is to be had to the accompanying drawings and the following description.

The improvement is susceptible to various changes in the form, proportion, and minor details of construction without departing from the principle or sacrificing any of the advantages thereof, and to a full disclosure of the invention an adaptation thereof is shown in the accompanying drawings, in which—

Figure 5:
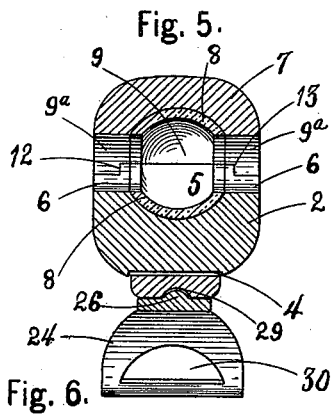
Figure 6:
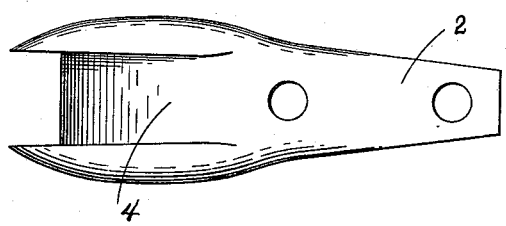
Figure 7:
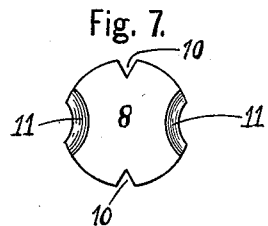

Figure 1 represents a side view of the preferred construction in its closed position. Fig. 2 represents a side view of the preferred device in its open position with the shaft part partially disengaged. Fig. 3 is a bottom view with the clamping-lever moved to one side. Fig. 4 is a longitudinal section on or about line $a\,a$, Fig. 3, the shaft part being omitted. Fig. 5 is a transverse section on or about line $b\,b$, Fig. 1, the shaft part being omitted. Fig. 6 is a detached bottom view of the stationary member or part. Fig. 7 is a detached plan view of the washer-blank. Fig. 8 represents a side view of the modified device closed. Fig. 9 represents a side view of the modified device open. Fig. 10 is a bottom plan view of the modification. Fig. 11 is a longitudinal section on or about line $c\,c$, Fig. 10, the shaft part being omitted. Fig. 12 is a transverse section on or about line $f\,f$, Fig. 10. Fig. 13 is a similar section on line $f\,f$, Fig. 10, the shaft part being removed. Fig. 14 represents a detached view of the modified form of washer employed in connection with the modified device.

In reference to the drawings in detail, like numerals designate like or corresponding parts in the several figures.

1 represents the axle, and 2 denotes a stationary draw-bar forming one member or part of the coupling, which is attached to the under side of the axle by the axle-clip 3 in the usual well-known manner and extends forward from the axle.

A longitudinal groove 4 extends from the forward end of the bar 2 a suitable distance along the lower surface, (see Fig. 6,) the purpose of which will be clearly hereinafter explained, and the surface of the upper side is provided with a depression or semispherical ball-cavity 5, and transverse semicircular depressions or grooves 6 extend from said cavity 5 to and through the sides of the draw-bar 2, and at an intermediate point between the axle 1 and the ball-cavity 5 on the upper side of the draw-bar 2 is a hinged joint 6ª, by which one extreme of the movable member or part 7 is hinged to the draw-bar 2.

In the under side of the movable member 7 is a depression or semispherical ball-cavity 9, having semicircular depressions or grooves 9ª, extending transversely through the sides of the movable member and corresponding with the grooves 6 in the stationary part. The stationary part and the movable part are so arranged and connected to each other that when they are closed together the semispherical cavities and the semicircular grooves form a hollow spherical space, from which openings circular in cross-section extend through the sides of the coupling.

A hardened-leather lining 8 is pressed into each of the two cavities 5 and 9. These leather linings 8 are first made in flat blanks, as shown in Fig. 7, having indentations or slots 10 cut at suitable intervals in their edges to remove the excess of material, so that the leather will not wrinkle at the edges when shaped into the concavo-convex form required to closely fit the sides of the cavities 5 and 9 when pressed into place. They are also chamfered off on the sides, as indicated at 11 in Fig. 7, to leave semicircular openings in the proper places to provide for the journals or round bolt parts of the couplings which pass through the circular openings extending through the sides of the coupling members or parts and formed by the semicircular grooves 5ª and 9ª when the stationary member and the movable member are closed and the ball part of the coupling is in place.

A circular flange 12 projects from the upper edges of the ball-cavity 5 in the stationary member 2 and is adapted to fit in the circular groove 13 in the movable member 7, formed by the enlargement of the edges of the cavity 9. This groove and flange afford means for allowing a slight intervening space between the adjacent edges of the coupling parts when they are closed and the ball part of the coupling is in place and at the same time act to prevent the entrance of dirt or dust into the interior of the ball-and-socket joint, thereby greatly lessening the friction and wear of the bearing parts of the coupling, the intervening space between the edges of the parts gradually lessening as the lining wears, and the wear is taken up by the spring means hereinafter described.

As the joint between the two members is at the side instead of the top, but slight opportunity is afforded for the lodgment of dirt or dust, and the upwardly-extending inner flange 12 acts as a wall to prevent the entrance of what little dirt does collect even when the two members are partially open, as the dirt has to travel up over the flange before reaching the inner bearing. When the two members are closed, the flange and groove are also concealed from view.

14 represents the rear end of a vehicle-shaft and shaft-iron having a forked end 15, provided with a transverse cross-bar 16, which extends substantially at right angles to the main part of the shaft-iron and is formed with a middle enlargement or ball portion 18, which fits into the depressions or cavities 5 and 9 of the coupling.

19 and 20 represent the shanks or bolt parts of the axle-clip 3, one being longer than the other and having nuts 21 and 22, which fasten the stationary draw-bar 2 in place on the axle. Over the nut 22, which is supported on the shank 20, the longer of the two, is placed a washer 23, upon which is mounted a spring-clamp 24, and a washer 25 is placed over said clamp to secure it in place. The end of the clip-shank is upset or riveted, thus pivoting the spring-clamp 24 thereto. The spring-clamp 24 is provided with a raised portion or teat 26. The end 27 of the movable member or part is provided with a hinge by which one end of an angular locking-lever 28 is hinged to said member. The locking-lever 28 is adapted when the parts of the coupling are closed to seat in the longitudinal groove 4 in the lower surface of the bar 2 and has a longitudinal depression or groove 29, into which the teat 26 on the spring-clamp is sprung when the said clamp is moved upon the locking-lever to firmly fasten the two parts or members of the coupling and the lever in a closed position. The depression 29 is preferably sufficiently long to permit the distance between the depression and the pivoting-point of the clamp to be varied to allow different sizes of axles to be used. The end of the clamp 24 is also provided with an opening or slot 30, through which a strap attached to the shaft may be passed, if desired, to additionally secure the clamp in its position when the coupling is closed.

The operation of my improved shaft-coupling is as follows: The transverse-bar part 16 and the ball parts 18 of the shaft-irons 14 are inserted in the cavities 5 and 9, and the movable member 7 is closed upon the fixed draw-bar or part 2, and the hinged lever 28 is moved upon its pivot into the depression or groove 4. The lever 28 is made just long enough so that when the spring-clamp 24 is swung around either in a longitudinal line with the axle or extending at right angles back of it there will be a short space between the outside of the spring-clamp and the outer end of the lever. When the spring-clamp 24 is swung around so as to extend forward and at substantially right angles from the axle, it presses and bears upon the end of the lever 28, the forward end of the spring-clamp 24 being slightly below the plane of the lever, so that the teat 26 presses against it, and when the clamp 24 is forced around to a longitudinal position above said lever the teat 26 drops into the depression or groove 29, thereby firmly clamping and locking the draw-bar 2 and the movable member 7 together and also holding the lever rigidly in place.

In the modified form shown in Figs. 8, 9, 10, 11, 12, 13, and 14 the modified stationary draw-bar, which I designate by the numeral 31, is attached to and extends forward from the axle and terminates at its outer end in the hinge-joint 32, and a depression or semispherical ball-cavity 33 is provided upon the under side of the bar between the hinge 32 and the axle 1, and a semicircular depression or groove 34 extends from said cavity through the side of the bar. The movable member 35 is hinged to the bar at the joint 32 and is provided with an extension 36. A semispherical depression or cavity 37 is provided in the movable member 35, and a semicircular depression or groove 38, corresponding to the depression or groove 34 in the bar, extends from said semispherical depression 37 transversely through the side of the member. The bar and the movable member are also provided with a circular groove 39 and a circular flange 40, similar to the groove 13 and the flange 12, shown in my preferred construction. The vehicle-shaft is provided with a journal or bolt part 41, extending at substantially right angles to the main part of the shaft and having an enlarged or ball end 42, which is supported in the spherical space formed by the two semispherical cavities when the coupling parts are closed. The bolt parts of the axle-clip are formed with one longer than the other, and a spring-clamp 43 is pivotally secured to the longer part and is adapted to be turned upon its pivot to a position over the extension 36 of the movable member, thereby firmly clamping the two parts of the coupling together. The clamp has a teat 44, similar to the teat upon the clamp in the preferred construction, and the extension 36 is provided with a longitudinal depression 45, into which the teat is adapted to seat. The cavities in the parts or members of the modified construction are also fitted with leather linings, the form of the blank being shown in Fig. 14, and it has indentations or slots 10 similar to the blank in the preferred construction, and as but one opening extends through the side of the coupling but one side of the blank is chamfered.

The advantages of my improved shaft-coupling are that it has but few parts, and those are so constructed and arranged with reference to the axle that the axle-clip is made to perform the double duty of securing the coupling to the axle and also acting as the means for pivotally supporting the clamping device for securing the movable parts together, thus producing a strong, neat, safe, and quick-shifting shaft-coupling, which can be cheaply and economically manufactured.

I claim as my invention—

1. A vehicle-shaft coupling, comprising two members hinged together, and having sockets for the reception of the shaft end, means for locking said members together, and an upwardly-extending flange surrounding the edge of the socket upon the lower member and adapted to fit in a depression in the edge surrounding the socket in the upper member, the meeting edges of both members exterior to the flange and depression extending outwardly to the sides thereof, in a horizontal direction, as set forth.

2. A vehicle-shaft coupling comprising two members provided with cavities for the reception of a shaft end; the lower member having a horizontal top edge terminating interiorly in an upwardly-extending flange surrounding its cavity and the upper member having a horizontal bottom edge terminating in an interior groove surrounding its cavity; the horizontal edges of the two members meeting and the flange extending into the groove when the two members are in their closed position, as set forth.

3. The combination with a vehicle-shaft provided with an extension having an enlargement, of a coupling comprising a stationary member rigidly attached to the axle, a movable member hinged to the stationary member, a longitudinal lever pivoted to the movable member and adapted to swing around and bear upon the stationary member on the side opposite the movable member, a device supported from the axle and adapted to swing over the lever to hold it in its position and the two members firmly closed, as set forth.

4. The combination with a vehicle-shaft, provided with an extension having an enlargement, of a coupling, having depressions in which the enlargement is adapted to be supported, and comprising a stationary member, having a longitudinal groove, a movable member hinged to said stationary member, an angular lever pivoted to the opposite end of the movable member, and adapted to extend around the end of the stationary member, and fit in the longitudinal groove and a spring-clamp for firmly holding it in said groove and the two members together in their closed position, as set forth.

5. The combination in a vehicle-shaft coupling, comprising a stationary part and a movable part hinged together and formed with semispherical cavities and transverse semicircular openings, adapted to receive the end of a spherical shaft connection, of a longitudinal extension pivoted to the movable part, and projecting longitudinally around the stationary part, and means for locking said extension in its position around said stationary part and thereby securing the stationary and the movable parts together in their closed position, as set forth.

6. A vehicle-shaft coupling, comprising a stationary member attached to the axle, and a movable member hinged to the stationary member, having a longitudinal lever provided with a locking-groove pivoted thereto, both members having sockets to receive the end of an enlarged shaft connection, and a clamping device supported from the axle and adapted to be moved into position to press upon the lever, and having a raised portion adapted to engage the locking-groove, for securing the coupling in its closed position, as set forth.

7. A vehicle-shaft coupling, comprising a stationary member attached to the axle, and having a longitudinal depression, and a movable member hinged to the stationary member; both members having cavities and transverse semicircular openings, a longitudinal lever pivoted to the movable member and provided with a locking-groove; said lever being adapted to be swung around the end of the stationary member into its longitudinal depression, and a spring-clamp attached to the axle, and adapted to be moved into position to press upon the lever and having a raised portion adapted to seat in the locking-groove for securing the coupling members together in their closed position, as set forth.

8. A vehicle-shaft coupling, comprising a stationary member attached to the axle and having a lower surfaced longitudinal depression and upper surfaced semispherical cavity and transverse semicircular openings, and a movable member hinged to the stationary member and having a lower surfaced cavity and transverse semicircular openings, a longitudinal lever pivoted to the movable member and provided with a locking-groove; said lever being adapted to be swung around the end of the stationary member into its lower surfaced longitudinal depression, and a spring-clamp attached to the axle and adapted to be turned horizontally to press upon the lever, and having a teat adapted to seat in the locking-groove for securing the lever in the longitudinal depression and fastening the coupling members together in their closed position, as set forth.

9. The combination with a vehicle-shaft provided with an extension having an enlargement, of a coupling having depressions in which the enlargement is adapted to be supported, and comprising a stationary member, a movable member hinged to said stationary member, an angular lever pivoted to the opposite end of the movable member, and adapted to extend around the end of the stationary member, and a spring-clamp for firmly holding the two members together in their closed position, as set forth.

10. The combination with a vehicle-shaft coupling comprising a stationary member rigidly attached to the axle, and a movable member having a longitudinal lever hinged to the stationary member, both members having depressions to receive the end of an enlarged shaft connection and a clamping device adapted to be moved upon the longitudinal lever of the clamping device for locking the two members together; of an axle-clip for securing said shaft-coupling to the axle, and also acting as support for the clamping device, as set forth.

RICHARD MULHOLLAND.

Witnesses:
JAS. M. MADIGAN,
JOHN G. DOHERTY.